(12) United States Patent
Cessac

(10) Patent No.: US 6,810,315 B2
(45) Date of Patent: Oct. 26, 2004

(54) AGRICULTURAL VEHICLE DISPENSER REGULATOR AND METHOD

(75) Inventor: Kevin J. Cessac, Houston, TX (US)

(73) Assignee: PGI International, Ltd., Houston, TX (US)

( * ) Notice: Subject to any disclaimer, the term of this patent is extended or adjusted under 35 U.S.C. 154(b) by 68 days.

(21) Appl. No.: 09/990,725

(22) Filed: Nov. 21, 2001

(65) Prior Publication Data

US 2003/0097213 A1 May 22, 2003

(51) Int. Cl.[7] .............................................. B06G 7/76
(52) U.S. Cl. ........................ 701/50; 701/36; 701/213; 239/11
(58) Field of Search ......................... 714/53, 36, 213; 111/170–200; 700/253, 243, 184; 239/1, 11

(56) References Cited

U.S. PATENT DOCUMENTS

| | | | | |
|---|---|---|---|---|
| 6,009,354 A | * | 12/1999 | Flamme et al. | 700/184 |
| 6,024,035 A | * | 2/2000 | Flamme | 111/178 |
| 6,070,538 A | * | 6/2000 | Flamme et al. | 111/170 |
| 6,070,539 A | * | 6/2000 | Flamme et al. | 111/177 |
| 6,079,340 A | * | 6/2000 | Flamme et al. | 111/178 |
| 6,079,632 A | * | 6/2000 | Yan | 239/1 |
| 6,089,743 A | * | 7/2000 | McQuinn | 700/240 |
| 6,236,907 B1 | * | 5/2001 | Hauwiller et al. | 700/283 |
| 6,457,427 B1 | * | 10/2002 | Moszoro et al. | 111/200 |
| 6,516,271 B2 | * | 2/2003 | Upadhyaya et al. | 701/213 |
| 6,522,948 B1 | * | 2/2003 | Benneweis | 700/243 |
| 6,553,299 B1 | * | 4/2003 | Keller et al. | 701/50 |
| 6,553,312 B2 | * | 4/2003 | Upadhyaya et al. | 701/213 |

* cited by examiner

*Primary Examiner*—Richard M. Camby
(74) *Attorney, Agent, or Firm*—Browning Bushman, P.C.

(57) ABSTRACT

A GPS unit 40 outputs a ground speed signal to an agricultural dispenser for applying chemicals to a field or for planting seeds. A GPS receiver 3 receives satellite signals from a plurality of satellites, and outputs a vehicle ground speed signal based upon GPS calculations. A converter 5 converts the vehicle ground speed signal to a series of pulses having a frequency indicative of the vehicle ground speed. The pulses are then transmitted to the agricultural dispenser 52 which is pulled by a tractor 34 to apply the desired amount of chemicals to the field or for planting the desired amount of seeds as a function of the vehicle ground speed.

21 Claims, 4 Drawing Sheets

$GPVTG,x.x,T,x.x,M,x.x,N,x.x,K*CS[CR][LF]

- Start of new message
- Two letter mnemonic identifing GPS source
- Three letter message content identification
- Track Made Good in degrees true
- Track Made Good in degrees magnetic
- Speed Over Ground (SOG) in knots
- Speed Over Ground (SOG) in kilometers per hour
- Two character hexadecimal checksum
- Carrage Return[CR] and Linefeed[LF] terminate message

*Fig. 3*

AGRICULTURAL VEHICLE DISPENSER REGULATOR AND METHOD

FIELD OF THE INVENTION

The present invention relates to regulators for agricultural vehicle dispensers and, more particularly, to a regulator that improves the accuracy and reliability of applying agricultural chemicals to fields and planting seeds.

BACKGROUND OF THE INVENTION

It is common practice in the agricultural industry to use electronically controlled implements for applying chemicals to fields and for planting seeds. This practice allows agricultural workers to drive the motive vehicle (tractor) at various speeds according to field conditions, yet have the application rate remain at the selected value. This practice also allows the agricultural worker to change the application rate by entering a new application rate value so as to optimize the application rate for field condition, such as various soil productivity data.

The term "application rate" is defined as the ratio of the amount of chemical(s) or seed in appropriate units to an appropriate standard unit of distance (or area) traversed by the implement that is applying the chemical(s) or planting seeds. For example, the application rate might be 200 pounds of anhydrous ammonia per acre, or it might be ten seeds per foot in each of 60 rows.

Maintaining optimum application rates for agricultural chemicals and seeds is economically important. If too much chemical is applied, the cost of the excess chemical will be lost, and possibly the plants and/or the soil could be damaged by the excess chemical. If too little chemical is applied, productivity (yield) will decrease and potential income will also be lost. Similarly, if seeds are planted too close or too distant, productivity and income will be lost. The application rates of some chemicals, such as herbicides and insecticides, are mandated in law.

The earliest techniques for controlling application rates for mechanized agricultural implements included various mechanical mechanisms, such as combinations of gears, chains, shafts, and related machine design elements that are operated off a wheel or axle of the implement in a direct drive fashion. One classic example of a pre-electronic agricultural dispensing implement is the manure spreader. Direct drive dispensing implements are subject to wheel slippage. The dispensing (application) rates of some of the implements were adjustable and others were not adjustable.

More recent dispensing technology for agricultural implements included a combination of various wheel speed sensors and electronically controlled dispensing devices. Using this technology, a wheel speed sensor produces an electronic signal that is received by a dispensing device on an agricultural implement. The signal from the wheel speed sensor is typically a stream of voltage pulses, the frequency of which represents the speed of the wheel. The dispensing device applies chemical or plants seeds at a rate that is proportional to the speed that is sensed by the wheel speed sensor. Typically the sensor is a shaft encoder that is attached to the tractor's axle, drive shaft, or power-take-off (PTO) shaft, although the wheel speed sensor could be mounted similarly on the implement pulled by the tractor Manufacturers of tractors, implements, and after-market devices have formed industry standards (protocols) for the electronic pulse trains that are produced by the wheel sensors and for the electronic cabling and connectors that are used in the technology. The standards resulted in wide spread compatibility that has benefitted the agriculture industry.

The wheel speed sensors discussed above have several deficiencies. The wheel speed sensor senses the wheel rotation rates, but not the actual speed of the implement over ground, which is critical to accurate dispensing rates. Wheel speed sensors produce inaccurate results due to wheel slippage, uneven ground conditions, and wheel size changes from wear or build up of mud and soil on the tire tread.

Ground speed sensing in the agriculture industry became available with the advent of Doppler radar speed sensors, as disclosed in U.S. Pat. Nos. 4,633,252 and 3,895,384. This technique is immune to the errors that are introduced by wheel slippage, change in wheel size, and differing wheel speeds in turns. However, Doppler radar speed sensors have their own deficiencies. Movement of obstructions in the microwave beam's path, such as grass moving in the wind and soil shifting due to the tractor's or implement's motions, can affect these speed sensors. The microwave radiation that the Doppler radar speed sensor uses presents potential biological hazards, as disclosed in FCC OET Bulletin 56, Questions and Answers about Biological Effects and Potential Hazards of Radiofrequency Electromagnetic Fields, August 1999.

Furthermore, the means and location of mounting the radar speed sensor pose problems. The angular direction of the radar microwave beam must be within two (2) degrees and the sensor must be mounted 30 to 36 inches above the ground. Doppler radar works best in direct line-of-sight measurement. Since such direct line-of-sight is not practical for agricultural vehicles and implements, the technique is not optimally applied. For agricultural applications, Doppler radar speed sensors must be mounted well above the ground level and they must be capable of compensating for the difference between theoretical ground speed and sensed ground speed. Mathematically, the two speed measurements differ due to the cosine of the angle between the ground plane and the incidence of the radar beam. When the ground plane varies, such as over varying field terrain, an error is introduced into the speed measurement. Practicioners in Doppler radar technology know this error as the cosine error. Every momentary variation in the radar sensor location, such as by vibration or flexing of the vehicle, and every momentary variation in the target location, introduces error into the speed measurement.

Given the relatively rough conditions of typical agricultural lands, the prior art does not satisfy the needs of the agriculture industry for an accurate and reliable means of measuring true ground speed for the purpose of achieving optimal application rates for agricultural chemicals and the planting of seeds.

The disadvantages of the prior art are overcome by the present invention, and an improved regulator from an agricultural vehicle dispenser and a method are hereinafter disclosed for more reliably applying agricultural chemicals to fields and for more reliably planting seeds.

SUMMARY OF THE INVENTION

According to the present invention, there is provided a speed-over-ground (SOG) sensor that receives position, speed, altitude, and other related data from the Global Positioning System of Earth-orbiting satellites and, based on that data, creates and conditions a stream of voltage pulses that accurately and reliably represents the true SOG of the sensor to industry-standard control circuits of agricultural chemical dispensing implements and seed planters.

It is therefore an object of the present invention to provide an improved speed-over-ground (SOG) regulator which utilizes GPS technology for use with agricultural chemical dispensing implements and seed planters.

A feature of the present invention is to provide an improved SOG regulator that is compatible with the cabling, connectors, and electronic signal protocol(s) of industry-standard control circuits of agricultural chemical dispensing implements and seed planters.

It is a feature of the present invention that the SOG sensor may be portable, and thus may be easily transferred between tractors or to other vehicles.

Yet another feature of the invention is that the regulator may be calibrated to a given control system one time. Continuous recalibrations which are commonly used in radar sensor systems are not required.

It is a further feature of the invention that the speed sensor does not present any radiation dangers, and accordingly the sensor need not be disabled when stationary.

Another feature of the invention is that the speed sensor is impervious to blowing grass, weeds, crops or sifting soil. The speed sensor is not affected by operational vibration and does not require rigid mounting to the vehicle to minimize or prevent vibration.

These and further objects, features, and advantages of the present invention will become apparent from the following detailed description, wherein reference is made to the figures in the accompanying drawings.

BRIEF DESCRIPTION OF THE DRAWINGS

FIG. 3 describes the digital signal protocol of each GPS data word.

DETAILED DESCRIPTION OF PREFERRED EMBODIMENTS

Figure 1:
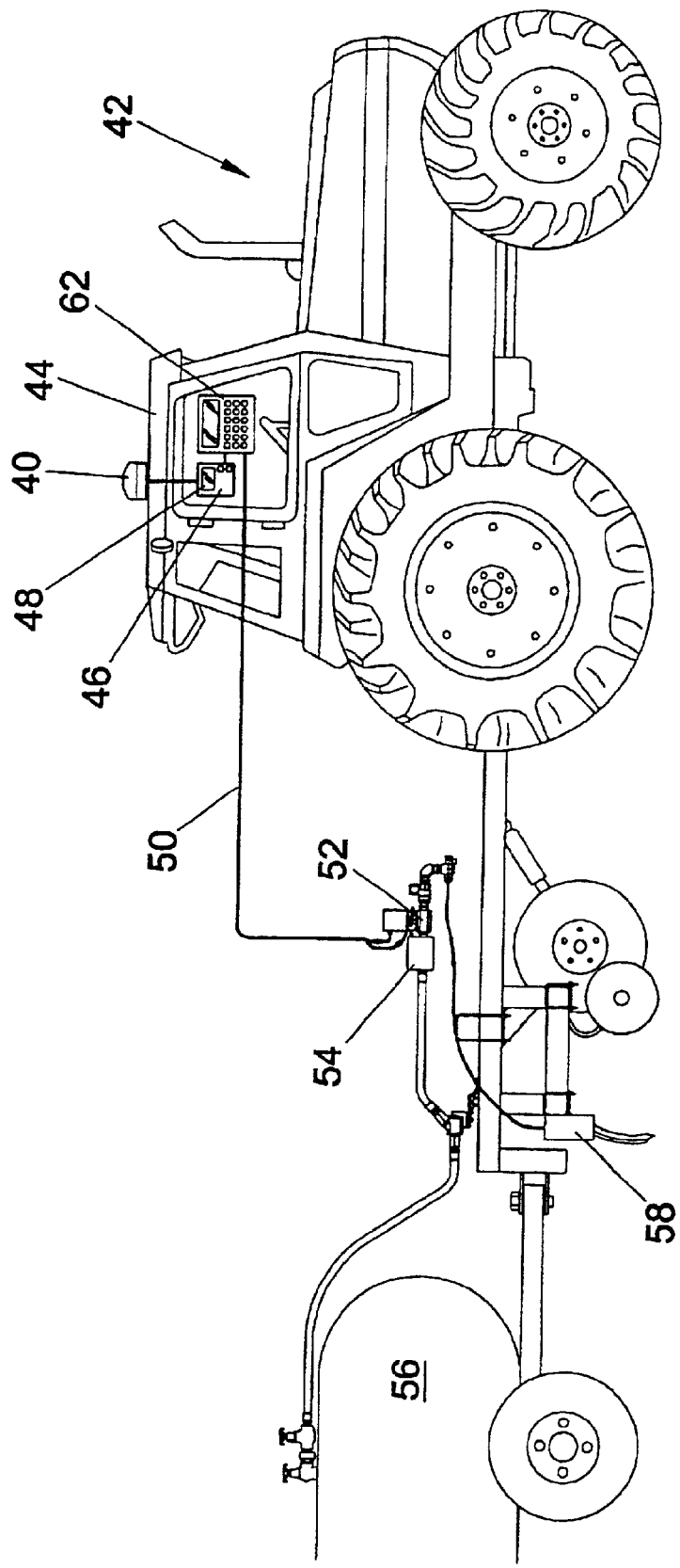
FIG. 1 is a simplified pictorial view of a tractor with a GPS sensor according to the present invention controlling the output of fertilizer to a field.

The present invention provides a regulator for outputting a ground speed signal to an agricultural dispenser. As shown in FIG. 1, a GPS speed sensor 40 may be mounted at any suitable location on a self-propelled farm vehicle, such as tractor 42. Conveniently mounted within the cab 44 of the tractor is a converter 46 for converting the ground speed signal from the GPS sensor 40 to a series of pulses having a frequency indicative of the ground speed. A display panel 48 may be provided so that the operator can visually monitor various parameters, including ground speed, the application rate for applying chemicals to the ground, the number of satellites, longitude, latitude, altitude and other GPS related parameter. Display 48 may also indicate to the operator that the GPS unit is receiving multiple satellite signals and is thus "ready" to output velocity ground speed signals to the converter. The output from the converter 46 is hardwired by line 50 to a control valve 52, which in turn regulates flow meter 54 which controls the flow of liquid ammonia from tank 56 to the knife bar 58 and thus to the ground. The control valve 52 and the flow meter 54 serve as a dispenser for applying chemicals to the field. The GPS sensor 40 and converter 46 are preferably mounted on the self-propelled vehicle, while the dispenser 52, 54 is mounted on the trailered implement, whether a fertilizer tank, a pesticide or weed control tank, or a seed planter. Those skilled in the art will appreciate that the concepts of the present invention may be used for applying various fertilizers or other chemicals to a field, or for planting seeds, since the pulse stream output from the converter 46 may be applied to various types of agricultural dispensers to regulate the rate at which chemicals are applied to the field or the rate at which seeds are planted in the ground. It is a particular feature of the present invention that the GPS unit 40 and the converter 46 as shown in FIG. 1 may be easily detachable from the controller 62, thereby allowing the GPS unit to be used on various tractors, or used for other purposes. If the GPS unit 40 were a conventional hand-held GPS unit, such as the eTrex Model manufactured by Garmin International or the Model 310 manufactured by Mogellan, then the unit 40 may be electrically disconnected from converter 46, and the unit 40 would have its own display.

The Global Positioning System (GPS) is based on a constellation of satellites that orbit the Earth at a very high altitude giving precision positions anywhere in the world. The U.S. Department of Defense developed GPS for navigation and designed the system to be impervious to jamming and interference, which makes it a reliable system. GPS is based on satellite ranging. A position on Earth is determined by accurately measuring the distance from a group of satellites in space. The distance to a satellite is determined by measuring how long a radio signal takes to reach a receiver. By using the distance measurement of a minimum of four satellites, and knowing the locations of those satellites in space, the GPS can triangulate a position on Earth, including altitude. To determine speed-over-ground (SOG), two positions are measured exactly one second apart. The distance in feet between the two positions is the speed in units of feet per second. Complex algorithms in the GPS receiver monitor a group of satellites to select the best group for the most accurate position solution. The present invention applies GPS technology to produce a true SOG sensor that enables industry-standard control devices to optimally apply agricultural chemicals and plant seeds.

Figure 2:
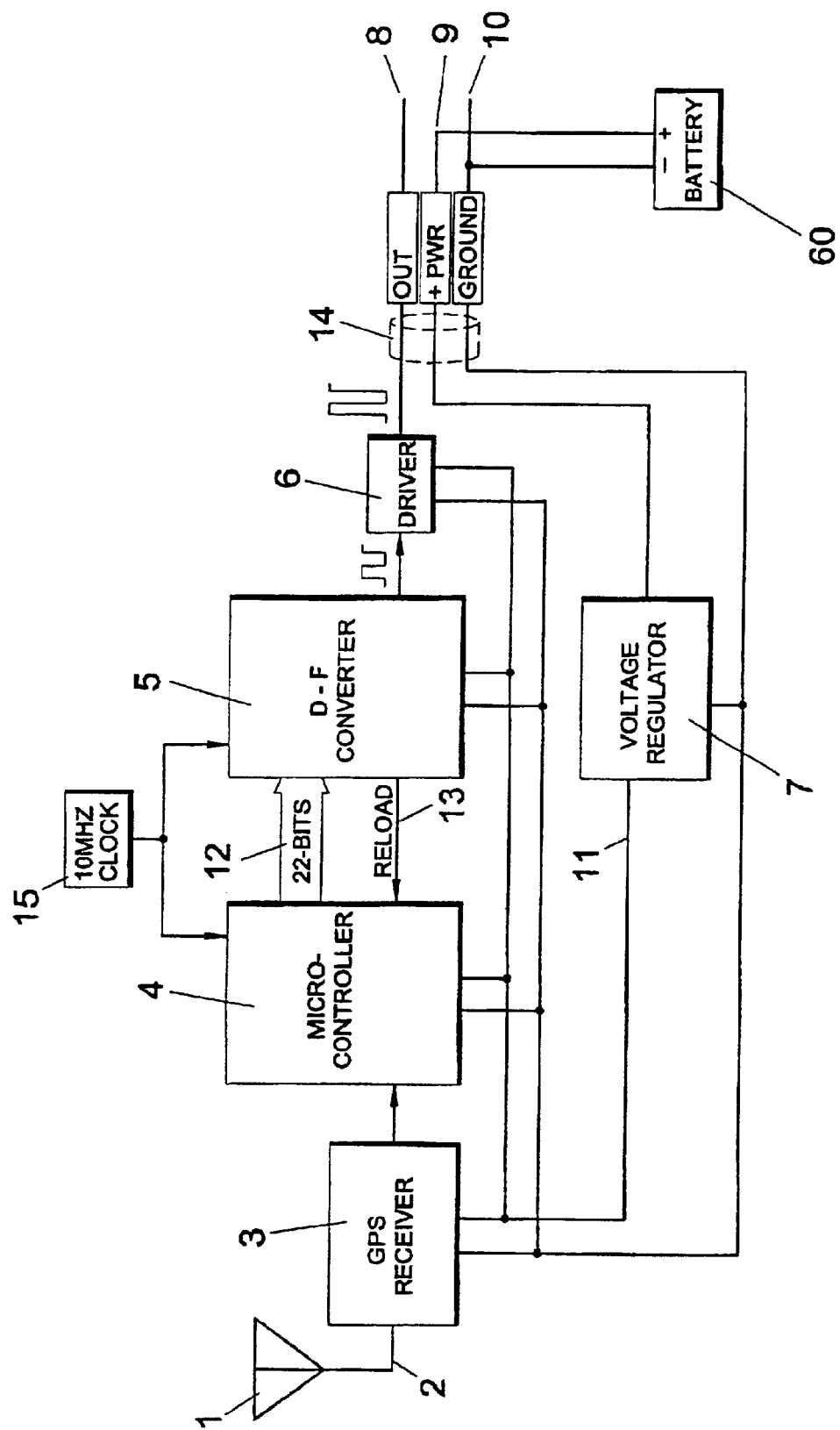
FIG. 2 is an overview schematic representation of the GPS-based SOG sensor of the present invention.

Referring to FIG. 2, the transmitted signal from four or more GPS satellites is received by antenna 1 and routed to the GPS receiver 3 through coaxial cable 2. The GPS receiver 3 transmits a serial NMEA 0183 message that includes the calculated speed to the microcontroller 4, which includes a computer. FIG. 3 shows a typical NMEA 0183 packet that includes the SOG value, which is the vehicle's speed. NMEA 0183 is a communications protocol that was developed for the marine industry and adopted by most manufacturers of GPS receivers as an industry standard. A suitable GPS receiver is the Lassen LP, which is manufactured by Trimble Navigation.

Figure 4:
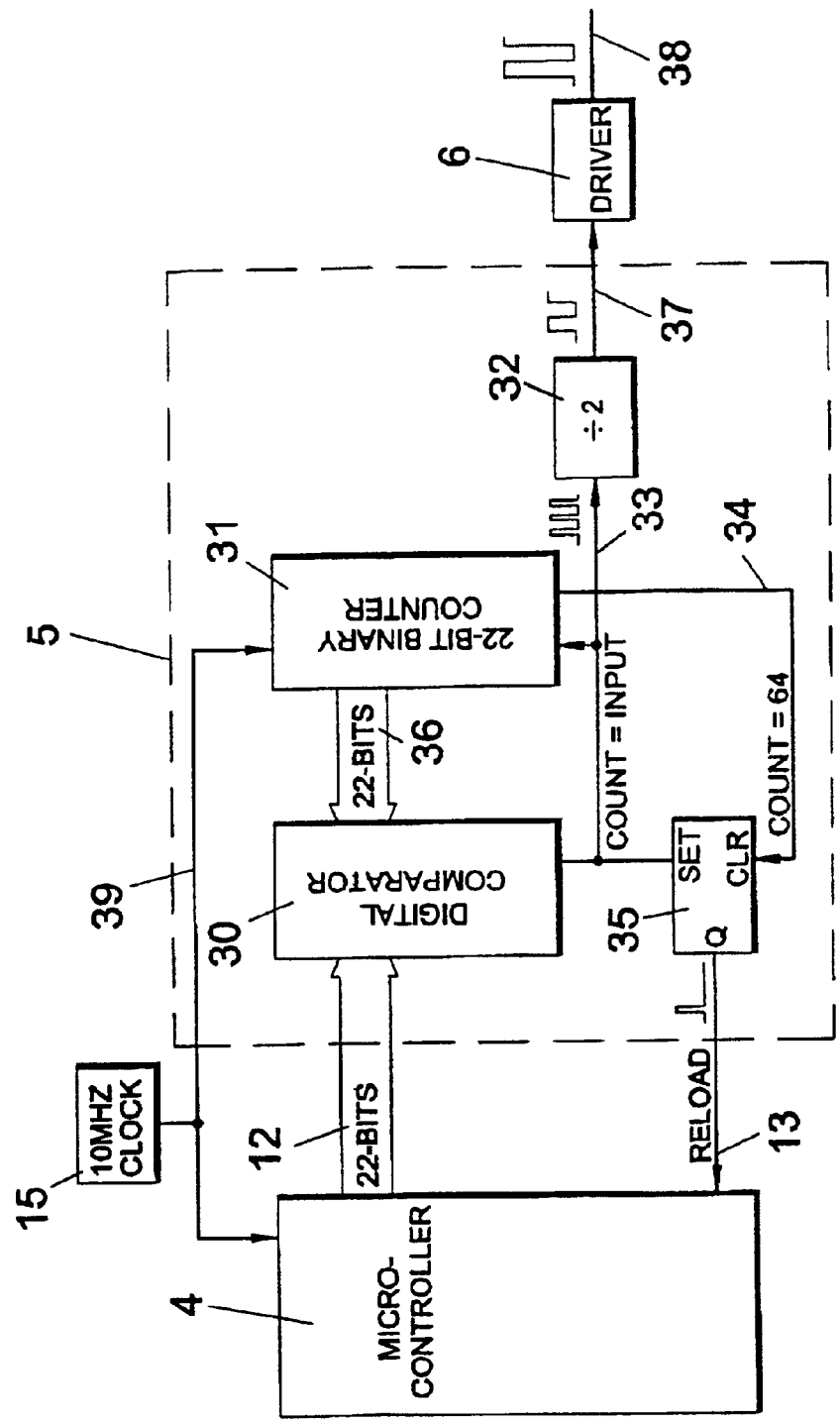
FIG. 4 is a detailed schematic representation of the digital-to-frequency converter portion of the SOG sensor's circuitry.

The microcontroller 4 receives the speed message to obtain the SOG information. The output signal 8 from the controller 4 is a pulse stream, the frequency of which is proportional to the SOG, e.g., 50 pulses per second per mile per hour. Referring to FIG. 4, a 22-bit word 12 that is proportional to two times the desired output period, or time between output pulses, may be provided to the digital-to-frequency (D-F) converter 5. The D-F converter 5 compares an internal count to the 22-bit word 12. The internal counter is clocked 15 at a fixed, relatively high frequency, for example, 10 megahertz. When the 22-bit count matches the 22-bit word 12, the count is reset to zero and a flip-flop 32 is toggled. The flip-flop 32 divides the narrow counter reset pulse by two to provide a 50% duty cycle on output 8. The GPS receiver 3 provides updated SOG information to the microcontroller 4 at least every 5 seconds, preferably at least every 2 seconds, and ideally every second. The microcontroller 4 determines a new period word for the D-F converter 5. The D-F converter 5 counts up until the count matches the value of the 22-bit word 12. When the count equals the value of the 22-bit word 12, the counter is reset to zero, clocking the flip-flop 32, and changing the output state. To prevent the microcontroller 4 from changing the 22-bit word 12 when the count is near or equal to the 22-bit input, feedback from the D-F converter 5 is provided by the reload signal 13. Reload 13 is at a high logic level when the D-F converter 5 counter is reset and returns to a low level after a relatively low count is passed. For example, a count of 64 would produce a 6.4 microsecond pulse at reload 13. The microcontroller 4 detects the rising edge of reload 13 as a safe time to update the 22-bit word 12. Connections to the GPS speed sensor are supplied through a multi-conductor cable 14.

The sensor is preferably assembled in a single housing, which includes the antenna, to simplify user installation. Cable 14 is routed from the sensor to the monitoring and control device on the application implement or seed planter. Voltage regulator 7 along line 11 interconnects the cable 14 with the receiver 3. Cable 14 includes output signal 8, power line 9 and ground 10. Connection to the monitoring device is made with an industry-standard connector in order to maintain backward compatibility with the wheel speed or radar SOG sensors.

FIG. 4 is a detailed view of the D-F converter 5 shown in FIG. 3. A 22-bit word 12, which represents the SOG, is applied to the digital comparator 30 and is updated once per second as the GPS receiver calculates a new SOG. The 22-bit counter 31 output is also fed into the digital comparator 30. The binary counter 31 increments every 0.1 microseconds by the clock signal 39 from the 10 MHz clock 15. When the count 36 equals the input 12, COUNT=INPUT 33 toggles to a positive level, sets the reload latch 35, toggles the output flip-flop 32, and resets the counter 31 to zero so that counting continues for the next cycle. When the count equals 64, latch 35 is cleared by counter output 34. The reload signal 13 to the microcontroller 4 drops to a low logic level to indicate that the D-F converter 5 is busy and the 22-bit word 12 should not be updated until the beginning of the next cycle. Output flip-flop 32 is toggled by the rising edge of the narrow COUNT=INPUT 33 pulse to produce a 50% duty cycle output 37. Driver 6 amplifies the D-F converter output 37 and increases the output power capability.

As shown in FIG. 2, a system according to the present invention may include a voltage regulator which receives power from a battery 60, which conveniently may be a battery on the tractor or other self-propelled vehicle 42. The voltage regulator 7 thus outputs power to a GPS receiver 6, and also to the converter 5 and the driver 6. The driver 6 functions to increase the voltage level of the pulses from the converter to ensure that the pulses have a sufficient voltage to be recognized by the agricultural dispenser, such as regulator 52. The voltage of the pulses from the driver 6 will preferably be greater than 4 volts, and typically will be approximately 12 volt pulses supplied to the dispenser. Also as shown in FIG. 2, the width (time duration) of the pulses from the converter 5 is preferably substantially equal to the width (time delay) between pulses, thereby ensuring that the dispenser is able to recognize each pulse output from the converter.

Referring again to FIG. 1, the GPS sensor 40 and the converter 46 are preferably provided on the self-powered vehicle 42, and the cable 14 as shown in FIG. 2 provides the pulse signals to the controller 62. Controller 62 then regulates the dispenser 52, which may be a liquid control valve, by electrical signals transmitted along line 50 as shown in FIG. 1. Controller 62 may also receive flow measurement signals from flow meter 54, so that both speed and flow information produces the desired application rate. Preferably the cable includes both power conductor 9, 10 as shown in FIG. 2, and the pulse signal conductor 8 from the converter which carries the series of pulses. Referring again to FIG. 1, the operator may be provided with a controller 62 for selectively varying the rate of dispensing chemicals to the field or planting seeds. The controller 62 may be a conventional dial gauge or may be a series of one or more toggle switches which, upon selection, increases or decreases the application rate for a selected period of time, or until the operator cancels the increased or decreased rate signal.

In the embodiment shown in FIG. 1, the converter 46 is positioned within the cab 44 and is physically separated from the GPS sensor 40. In another embodiment, both the GPS sensor and the converter are included within a common housing, so that the output from the GPS sensor 40 is already converted to a stream of pulses. In yet another embodiment, the GPS unit 40 may be housed with or separate from the converter 46, but the GPS unit 40 is easily detachable electronically from the converter. This feature allows the GPS unit 40 to be easily removed from one vehicle and placed on another vehicle, or alternatively removed from the tractor and used for other purposes. By making the GPS unit easily detachable from the converter, a conventional GPS unit used by the operator for other purposes may be electronically connected to the converter 46 only when the operator is using the GPS unit as part of the system according to the present invention for dispensing chemicals or for planting seeds.

A modification of the SOG sensor circuitry uses the altitude code in the NMEA 0183 data word from the GPS receiver. Application of this code would enable modifications of control circuits for application devices for applying agricultural chemicals and for seed planters based on altitude, since it is generally known that hill tops are usually less productive than valley floors and that such variations usually indicate different application and planting rates.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A regulator for outputting a pulse signal to an agricultural dispenser for applying chemicals to a field or for planting seeds, the regulator comprising:

a GPS unit for outputting a ground speed signal indicative of the velocity of the agricultural dispenser in response to satellite signals; and a converter for converting the ground speed signal to a series of pulses having a frequency indicative of the ground speed signal and outputting the series of pulses; and a driver for increasing a voltage level of the pulses to greater than 4 volts to the agricultural dispenser.

2. The regulator as defined in claim 1, further comprising:
the GPS unit and the converter being mounted on a self-propelled vehicle; and
a wireline electrically interconnecting the converter with the dispenser positioned on a trailered implement.

3. The regulator as defined in claim 1, further comprising:
a battery supported on the self-propelled vehicle; and
a cable transmits power from the battery to the dispenser and houses the wireline which connects the converter to the dispenser on the trailered implement.

4. The regulator as defined in claim 1, wherein the GPS unit outputs an updated signal ground speed signal at least every two seconds.

5. A GPS receiver as defined in claim 1, wherein the GPS unit outputs an updated ground speed signal at least every second.

6. The regulator as defined in claim 1, further comprising:
a voltage regulator for receiving power from a battery and outputting a controlled voltage to power the GPS unit and the converter.

7. The regulator as defined in claim 1, further comprising:
a driver for increasing the voltage of the series of pulses output from the converter and supplying increased voltage pulses to the dispenser.

8. The regulator as defined in claim 1, wherein the converter outputs a series of pulses each having a pulse duration substantially equal to a delay between successive pulses.

9. The regulator as defined in claim 1, further comprising:
an operator input controller for varying a selected rate distributor for the agricultural dispenser, the operator input controller and the ground speed signal determining the frequency of the series of pulses.

10. The regulator as defined in claim 1, when a GPS unit is detachable from the converter.

11. A regulator for outputting a pulse signal to an agricultural dispenser for applying chemicals to a field or for planting seeds, the regulator comprising:
a GPS unit for outputting a ground speed signal indicative of the velocity of the agricultural dispenser in response to satellite signals;
a converter for converting the ground speed signal to a series of pulses having a frequency indicative of the ground speed signal and outputting the series of pulses to the agricultural dispenser;
a driver for increasing a voltage level of the pulses to greater than 4 volts to the agricultural dispenser;
the GPS unit and the converter being mounted on a self-propelled vehicle; and
a wireline electrically interconnecting the converter with the dispenser positioned on a trailered implement.

12. The regulator as defined in claim 11, further comprising:
a battery supported on self-propelled vehicle; and
a cable transmits power from the battery to the dispenser and houses the wireline which connects the converter to the dispenser on the trailered implement.

13. A GPS receiver as defined in claim 11, wherein the GPS unit outputs an updated ground speed signal at least every second.

14. The regulator as defined in claim 11, further comprising:
a voltage regulator for receiving power from a battery and outputting a controlled voltage to power the GPS unit and the converter; and
a driver for increasing the voltage of the series of pulses output form the converter and supplying increased voltage pulses to the dispenser.

15. The regulator as defined in claim 11, wherein the converter outputs a series of pulses each having a pulse duration substantially equal to a delay between successive pulses.

16. A method of outputting a ground speed signal to an agricultural dispenser for applying chemicals to a field or for planting seeds, the method comprising:
providing a GPS unit for outputting a ground speed signal indicative of the velocity of the agricultural dispenser in response to satellite signals;
converting the ground speed signal to a series of pulses having a frequency indicative of the ground speed signal;
increasing a voltage level of the pulses to greater than 4 volts; and
outputting the series of pulses to the agricultural dispenser.

17. The method as defined in claim 15, further comprising:
mounting the GPS unit and the converter on a self-propelled vehicle; and
electrically interconnecting the converter with the dispenser positioned on a trailered implement.

18. The method as defined in claim 17, further comprising:
supporting a battery on the self-propelled vehicle; and
providing a cable for transmitting power from the battery to the dispenser and for housing a wireline which connects the converter to the dispenser on the trailered implement.

19. The method as defined in claim 16, wherein the GPS unit outputs an updated ground speed signal at least every two seconds.

20. The method as defined in claim 15, wherein the converter outputs a series of pulses each having a pulse duration substantially equal to a delay between successive pulses.

21. The method as defined in claim 15, further comprising:
providing an operator input controller for varying a selected rate distribution for the agricultural dispenser, the operator input controller and the ground speed signal determining the frequency of the series of pulses.

* * * * *